United States Patent [19]

Collins et al.

[11] Patent Number: 5,325,511

[45] Date of Patent: Jun. 28, 1994

[54] TRUE LEAST RECENTLY USED REPLACEMENT METHOD AND APPARATUS

[75] Inventors: Michael J. Collins, Tomball; Roger E. Tipley, Houston, both of Tex.

[73] Assignee: Compaq Computer Corp., Houston, Tex.

[21] Appl. No.: 121,978

[22] Filed: Sep. 14, 1993

Related U.S. Application Data

[63] Continuation of Ser. No. 14,064, Feb. 5, 1993, abandoned, which is a continuation of Ser. No. 539,026, Jun. 15, 1990, abandoned.

[51] Int. Cl.$^5$ .................. G06F 12/00; G06F 12/02
[52] U.S. Cl. .................. 395/425; 364/DIG. 1; 364/243.41; 364/246.13; 364/246.12; 364/966.1
[58] Field of Search ............ 395/425; 364/200 MS, 364/900 MS, 246.1, 246.12, 246.13

[56] References Cited

U.S. PATENT DOCUMENTS

| | | | |
|---|---|---|---|
| 3,949,368 | 4/1976 | West | 395/425 |
| 4,168,541 | 9/1976 | DeKarske | 365/230 |
| 4,181,937 | 1/1980 | Hattori et al. | 395/200 |
| 4,334,289 | 6/1982 | Lange et al. | 364/900 |
| 4,442,488 | 4/1984 | Hall | 395/425 |
| 4,467,411 | 8/1984 | Fry et al. | 395/250 |
| 4,719,568 | 1/1988 | Carruba et al. | 364/200 |
| 4,811,203 | 3/1989 | Hamstra | 364/200 |
| 4,967,414 | 10/1990 | Lusch et al. | 364/200 |
| 4,996,641 | 2/1991 | Talgam et al. | 395/425 |
| 5,055,999 | 10/1991 | Frank et al. | 364/200 |
| 5,091,850 | 2/1992 | Culley | 395/400 |
| 5,113,510 | 5/1992 | Hillis | 395/425 |
| 5,125,085 | 6/1992 | Phillips | 395/400 |

FOREIGN PATENT DOCUMENTS 0069250 6/1982 European Pat. Off.
0090575 3/1983 European Pat. Off.

OTHER PUBLICATIONS

5-Bit Least Recently Used Code for 4-Way Set Associativity, IBM Technical Disclosure Bulletin vol. 31, No. 11, Apr., 1989.

Primary Examiner—Joseph L. Dixon
Assistant Examiner—Frank J. Asta
Attorney, Agent, or Firm—Pravel, Hewitt, Kimball & Krieger

[57] ABSTRACT

An apparatus for performing Least Recently Used techniques for a four way set associative cache system which includes a random access memory (RAM) which stores the ways representing the least recently used (LRU), most recently used (MRU) and LRU+1. The MRU-1 is developed by XORing the other three LRU way information values. Processor or snoop operation is determined and the way use aging information valued is based on snooping or processor operations. For processor operations the accessed or to be accessed way is set as the MRU, while in snoop operations, the way being accessed is set as the LRU. The aging of the remaining ways is shuffled accordingly. This shuffling occurs each cycle but is only stored on processor cache hit, processor read cache miss and snoop hit operations.

7 Claims, 10 Drawing Sheets

TRUE LEAST RECENTLY USED REPLACEMENT METHOD AND APPARATUS

This is a continuation of co-pending application Ser. No. 08/014,064 filed on Feb. 5, 1993 now abandoned, which is a continuation of co-pending application Ser. No. 539,026 filed on Jun. 15, 1990 now abandoned.

BACKGROUND OF THE INVENTION

1. Field of the Invention

The invention relates to cache memory systems used in computer systems, and more particularly to the replacement of items when new items must be added to the cache memory system.

2. Description of the Related Art

Personal computers are becoming more powerful with each passing moment, or so it seems. The performance of the systems is great, but further performance is always being demanded. To this end, ever faster components are being used in the computer systems. The development of the key component of the computer system, the microprocessor, has outpaced the development of memory devices designed to work with the microprocessor. The cycle times of the microprocessor are quite low, so only very fast memory devices can be used or the microprocessor operations have to be slowed down, thus decreasing system performance. However, the memory devices capable of operating at the required speeds are relatively small and are expensive. Thus it is generally cost prohibitive to construct the entire main memory of the computer system using these fast memory devices. Thus performance must suffer because of economics.

One approach to resolve this conflict has been the use of cache memory systems. In a cache memory systems a small amount of the fast memory is used in conjunction with a large amount of slower memory. The slower memory forms the main system memory, while the small, fast memory contains portions of the data in the slower main memory. The cache memory generally contains recently used data, on the hope, which is statistically based, that the data will be reused soon. Then the data is available directly from the fast cache memory, without the delay penalty developed when accessing the slower main memory.

However, the cache memory is much smaller than the main memory and so some replacement policy is necessary. Some data must be removed from the cache to allow new data to be stored. The most widely preferred technique is the least recently used (LRU) technique. In that approach the least recently used of a series of locations is overwritten, thus keeping the newer data available for use. While this is a desirable goal, in practice it is quite difficult to implement in certain cases. Depending on the number of ways in a set associative cache design the number of bits of memory required to perform a true LRU is quite high. Sufficient information must be kept to keep track of the LRU way for each set in the cache. Additionally, the total time to develop the LRU information must not cause a delay in any cycle or either performance will suffer or costs will increase.

To resolve some of these problems pseudo-LRU techniques have been developed. One example of a psuedo-LRU technique is the Intel Corporation i486 microprocessor, which uses a 4 way set associative cache architecture. Three bits are provided to determine first, which half of the ways was least recently used and then second, which of the two ways in the half was least recently used. This is a pseudo-LRU technique because it does not account for properly reshuffling the order based on read hits to a particular way. It is possible for the least recently used way in a first half to remain unused for a longer period than both the ways in the second half if the most recently used way in the first half is continually the basis of an intervening read hit. Thus relatively stale data could be present, degrading cache system performance.

The major reason for employing pseudo-LRU techniques is simplicity of the logic and smaller amount of memory required for the LRU status information. The designer must make a trade off between the performance loss and the system complexity, and so many times pseudo-LRU techniques are used. However, the pseudo-LRU techniques become much more suboptimal as the total cache size gets smaller and the number of ways increases. Thus true LRU techniques become more important or major performance losses can occur.

SUMMARY OF THE INVENTION

The present invention allows the use of a true LRU technique without greatly complicating the logic or using significantly greater amounts of memory for the LRU status information. A four way set associative cache is used, with six bits being used to store indications of the LRU, LRU+1 and MRU ways, with the MRU-1 way being determinable from those values. The effect of intervening hit operations is fully understood and compensations made. The operations work in reverse order when snooping operations are occurring, so that snooped locations are considered the least recently used and the first replaced. A snoop operation occurs when a bus master other than the processor is accessing the memory and the cache controller is monitoring the operation of the bus master. Generally only bus master writes are of concern because cache data may be invalidated in those cases.

The six LRU bits for each set in the cache are stored in a random access memory (RAM) six bits in width. During each memory operation the current values are provided by the LRU RAM. If a processor operation cache hit is occurring, that particular way is made the MRU way, with an indication provided whether this way was the LRU, the LRU+1 or the MRU way. Using the indications, the LRU values are shuffled to indicate the proper time reference and aging sequence of the ways. If a processor cache read miss operation is occurring the LRU way receives the data being read and is designated as the MRU, with the remaining ways being shuffled properly. If a snoop cache hit is occurring, that particular way is made the LRU way, with an indication whether the way was the LRU, LRU+1 or MRU way and the remaining ways being properly shuffled.

The LRU information is obtained and recalculated each memory cycle but is written only when hits or processor read cache misses occur.

BRIEF DESCRIPTION OF THE DRAWINGS

A better understanding of the present invention can be developed when the detailed description is read in conjunction with the drawings, in which.

DETAILED DESCRIPTION OF THE PREFERRED EMBODIMENT

Figure 1:
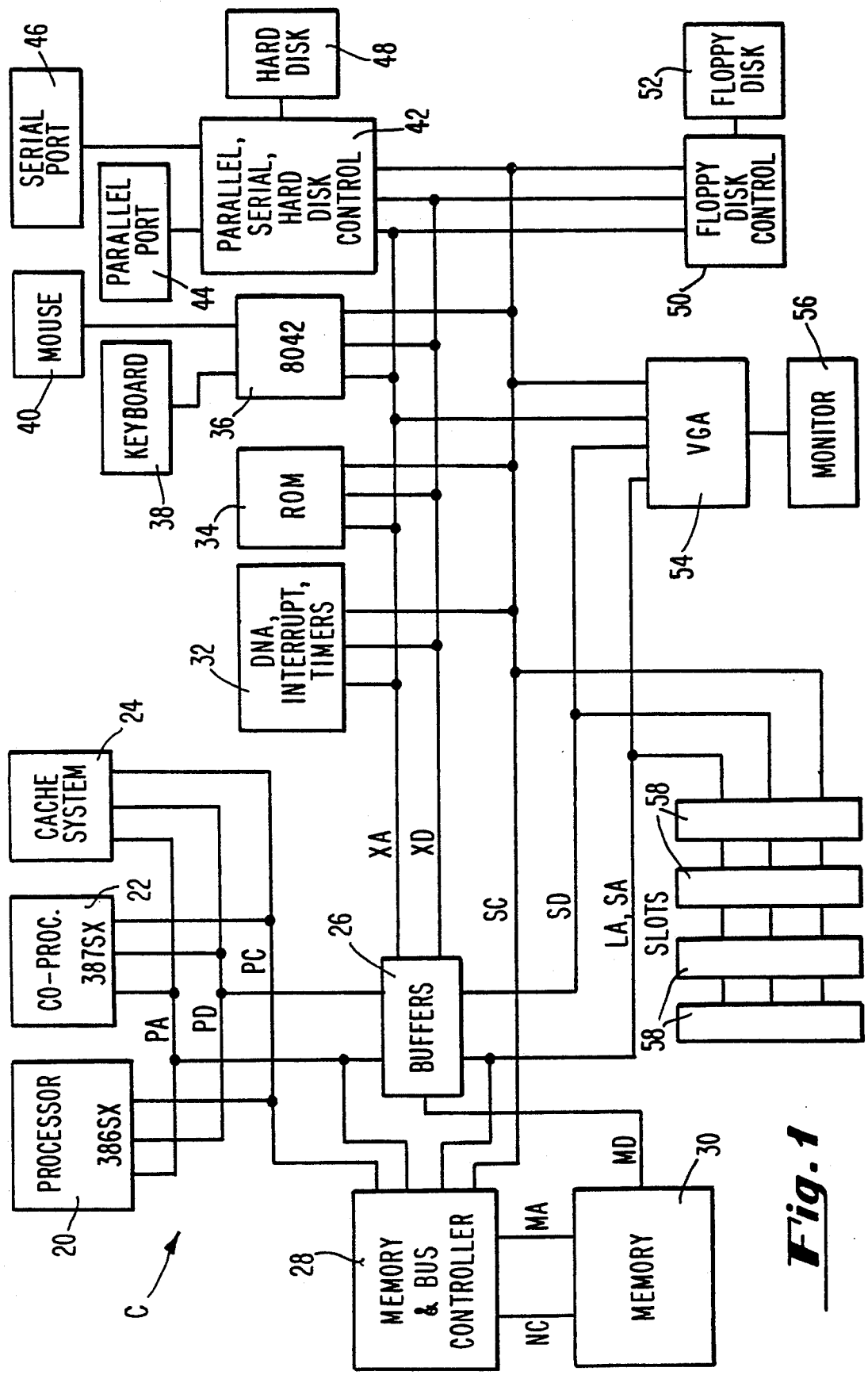
FIG. 1 is a block diagram of a computer system incorporating the present invention.

Referring now to FIG. 1, a computer system generally referred to by the letter C is shown. The computer system C includes a processor 20, preferably an Intel Corporation (Intel) 80386SX. Coupled to the processor 20 are three buses referred to as the PA, PD and PC or processor address, processor data and processor control buses, a numeric coprocessor 22, preferably an Intel 80387SX and a cache system 24. The cache system 24 incorporates the least recent used (LRU) techniques of the present invention. A series of buffers 26 are used to couple the processor address bus PA and processor data bus PD to the other various portions of the computer C. For example, the buffers 26 are connected to a memory data bus MD, an external bus including the external address bus XA and the external data bus XD, and a system bus including the system control bus SC, the system data bus SD and the system address buses LA and SA. A memory and bus controller 28 is connected to the processor address bus PA and processor control bus PC as well as the system control bus SC and the system address buses LA and SA. The memory and bus controller 28 is responsible for converting the control signals and addressing information provided by the processor 20 to the signals used in the system bus. Further, the memory and bus controller 28 transfers any control signals and addressing signals from the various devices present elsewhere in the system, generally another bus master, to the processor buses PA and PC if appropriate. Additionally, the memory and bus controller 28 provides the memory control and addressing information to the memory 30.

A direct memory access (DMA) system, an interrupt controller and various timers are included in a module 32 which is connected to the external address bus XA, external data bus XD and the system control bus SC. The read only memory (ROM) 34 provided in the computer 34 is also connected to the XA, XD and SC buses. The ROM 34 contains the basic operating instructions of the computer system C. A keyboard controller 36, typically an 8042 microcontroller, is also coupled to the XA, XD and XC buses so that it is interfaced to the processor 20 for providing keyboard inputs received from a keyboard 38 or mouse or other pointing device 40 to the processor 20. A combined circuit 42 provides the parallel, serial and hard disk control functions for the computer C. Therefore a parallel port 44, a serial port 46 and a hard disk unit 48 are connected to this combined circuit 42. The combined circuit 42 communicates with the processor 20 over the XA, XD and SC buses. Similarly, a floppy disk controller 50 is also coupled via the XA, XD and SC buses to allow a floppy disk unit 52 to be controlled.

The video output of the computer C preferably includes a VGA controller 54 which is coupled to the XA, LA, SA, SD and SC buses and to a monitor 56. A series of slots 58 are also connected to the system buses LA, SA, SD and SC to provide inclusion of interchangeable circuit boards if desired. These interchangeable circuit boards can provide additional functions or bus mastering devices utilized in the computer C for individualization. It is noted that when a bus master is located in one of the slots 58 or the DMA controller is operating, the processor 20 is in a hold condition and address and control information and data provided by the bus master is provided through the buffers 26 to the memory in bus controller 28 and reflected onto the processor buses PA, PD and PC. Thus only one master device is operating at a given time in the computer system C.

Figure 2:
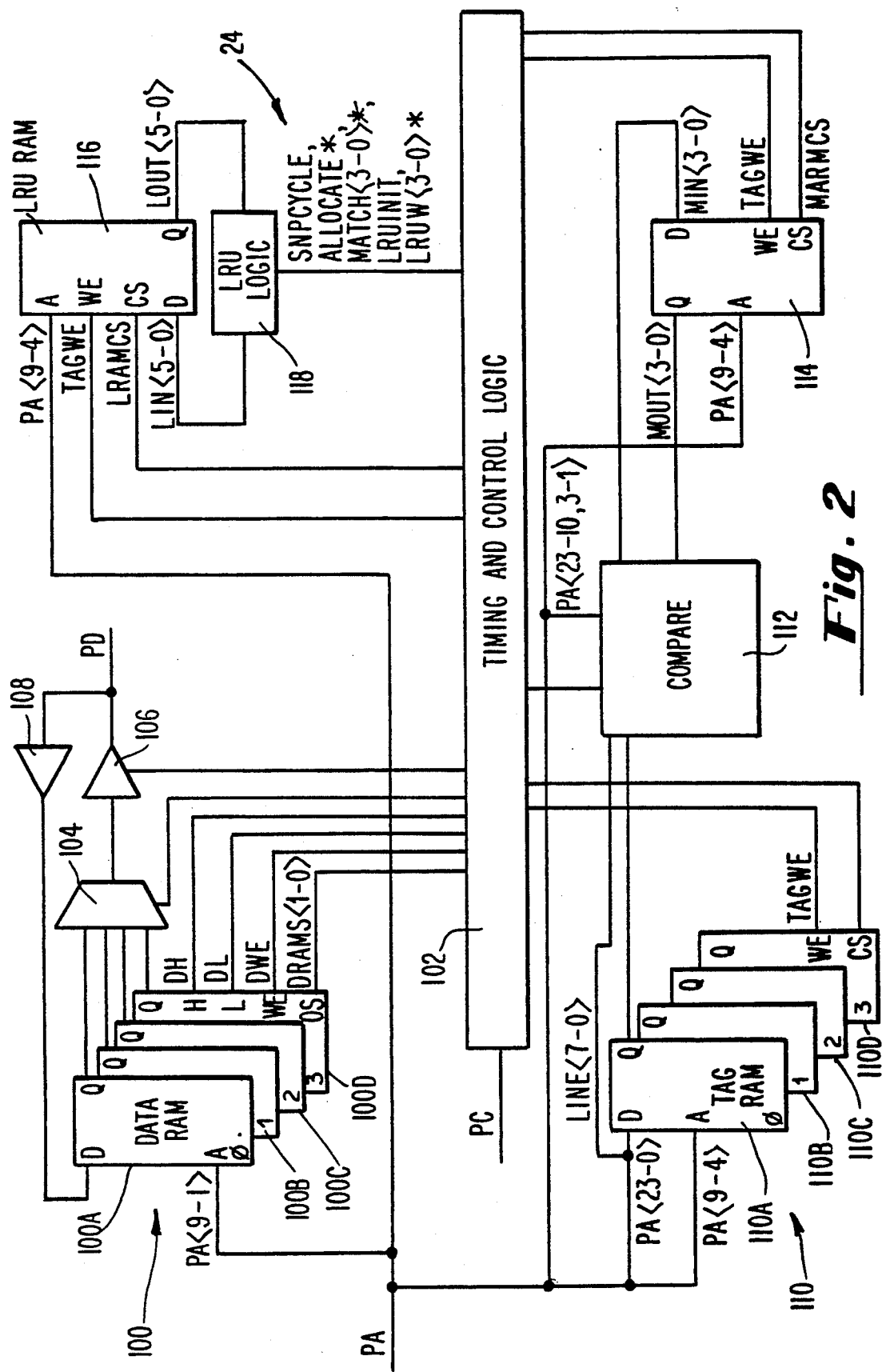
FIG. 2 is a block diagram of the cache system of the computer of FIG. 1.

The cache system 24 is shown in more detail in FIG. 2. The preferred embodiment of the cache system 24 is a four way set associative cache having a total size of 4K bytes. To this end the cache system 24 includes four banks of DATA RAM 100A, 100B, 100C and 100D, which will be referred to generally as 100. Each DATA RAM bank 100A-100D is preferably 16 bits wide in the preferred embodiment and includes separate input and output data ports. Bits 9-1 of the processor address bus PA are provided to the address inputs of the DATA RAM 100. A signal referred to as DWE or data write enable is provided to the DATA RAM 100 from a timing and control logic module 102 as necessary when data is to be written into the DATA RAM 100. Additionally, signals referred to as DH and DL for data high byte and data low byte are provided by the timing and control logic 102 to select which of the bytes of the data word are to be provided or stored. Each bank, which corresponds to a way of the cache system 24, of the DATA RAM 100A-100D is provided with an individual chip select signal referred to as DRAMCS. The DRAMCS<3-0> signals, for ways or banks 3 to 0, are provided by the timing and control logic 102, thus allowing independent operation of the particular ways. The data outputs of the DATA RAM 100 are provided to a 16 bit wide 4 to 1 multiplexer 104, whose routing is controlled by signals from the timing and control logic 102. The outputs of the multiplexer 104 are provided to a 16 bit wide tristate buffer 106, whose outputs are connected to the processor data bus PD. The output control of the buffer 106 is provided by the timing and control logic 102. The processor data bus PD is also connected to the inputs of a 16 bit wide buffer 108, whose outputs are connected to the D or data inputs of the DATA RAM 100.

In addition to data storage, the cache system 24 also includes a series of RAM's to contain the tags or upper address values and line valid bits associated with the particular data values stored at a location in the DATA RAM 100. The preferred tag value is the upper 14 bits of the address, with 2 bytes per line, 8 lines per set and 64 sets being values of the cache organization parameters. Because this is preferred to be a four way set associative cache system, there are four individual banks of TAG RAM's, generally referred to as 110 and individually referred to as 110A, 110B, 110C and 110D. The TAG RAM 110 is preferably 22 bits wide to store the processor address bits 23-10 and eight line valid bits referred to as LINE<7-0>. The processor address bits PA<9-4> are provided to address inputs of the TAG RAM 110 for addressing purposes. A write enable signal referred to as is TAGWE provided by the timing and control logic 102, while four signals referred to as the TAGCS<3-0> are connected to the chip select inputs of the TAG RAM's 110A-110D. In this way the timing and control logic 102 can determine when data is written to the TAG RAM 110 and obtained from the TAG RAM 110.

The outputs from the four TAG RAM's 110A–110D are provided to a comparator 112. Also provided to the comparator 112 are the processor address lines 23-10 and 3-1 so that determinations can be made as to whether the particular address being asserted on the processor address bus PA is present in the cache system 24. Various control signals are also received by the comparator 112 from the timing and control logic 102. These 22 bits of data from each bank of the TAG RAM's 110A–110D are provided to the comparator 112, to be used with the processor address signals 23-10 and 3-1 for tag address and line valid checking.

The comparator 112 is also connected to a TAG VALID RAM 114. This RAM is preferably 4 bits wide, 1 bit corresponding to each way. The TAG VALID RAM 114 receives as address inputs the processor address lines 9-4 and provides 4 bits of data referred to as MOUT<3-0> to the comparator 112. The comparator 112 provides the MIN<3-0> signals to the data inputs to the TAG VALID RAMS 114. The comparator 112 therefore includes the logic necessary to determine if a particular tag value is present in the memory and whether the particular line or tag value is valid. The TAG VALID RAM 114 also receives the TAGWE signal for write enablement and the MRAMCS signal for general RAM select the timing control logic 102.

A 6 bit wide LRU RAM 116 is present in the cache system 24. The LRU RAM 116 is where the LRU data for each set in the cache system 24 is stored. The LRU RAM 116 receives as address inputs the processor address lines 9-4 and receives the TAGWE and LRAMCS signals provided by the timing and control logic 102 to the write enable and chip select inputs. The 6 data outputs, referred to as LOUT<5-0>, provided by the LRU RAM 116 are sent to the LRU logic 118. The data inputs to the LRU RAM 116, the LIN<5-0> signals, are provided by the LRU logic. Various signals are coupled between the LRU logic 118 and the timing and control logic 102, including the SNPCYCLE signal, which indicates that a snoop cycle is in progress; the ALLOCATE* signal, which is an indication that a cache read miss has occurred; the MATCH<3-0>* signals, which are an indication that a tag match has occurred; the LRUINIT signal which is an indication that the LRU RAM 116 should be initialized and the LRUWAY<3-0>* signals, which indicate to the timing and control logic 102 which way should be utilized to store data. A snoop cycle is one where a bus master, such as the DMA controller or a bus master installed in a slot 58 has control of the system C and is providing address information to the memory 30. Snoop cycles are of interest, particularly write cycles, because cache data can be invalidated if the bus master writes to a memory location contained in the cache. Thus the cache system 24 monitors snoop write operations for possible line invalidation.

In review, the TAG RAM 110 contains the tag values and line valid values for each of the 128 sets in the cache, while the TAG VALID RAM 114 contains values indicating whether the tags for the set are valid. The LRU RAM 116 contains the LRU-related information for each set. The comparator 112 uses the tag values, the line valid values and the tag valid values to determine if cache hits or misses occur for both processor and snoop cycles and whether the miss is due to a line being invalid or the entire tag being invalid. The LRU RAM 116 and LRU logic 118 provide indications of which way to use when new data must be stored in the cache.

Figure 3:
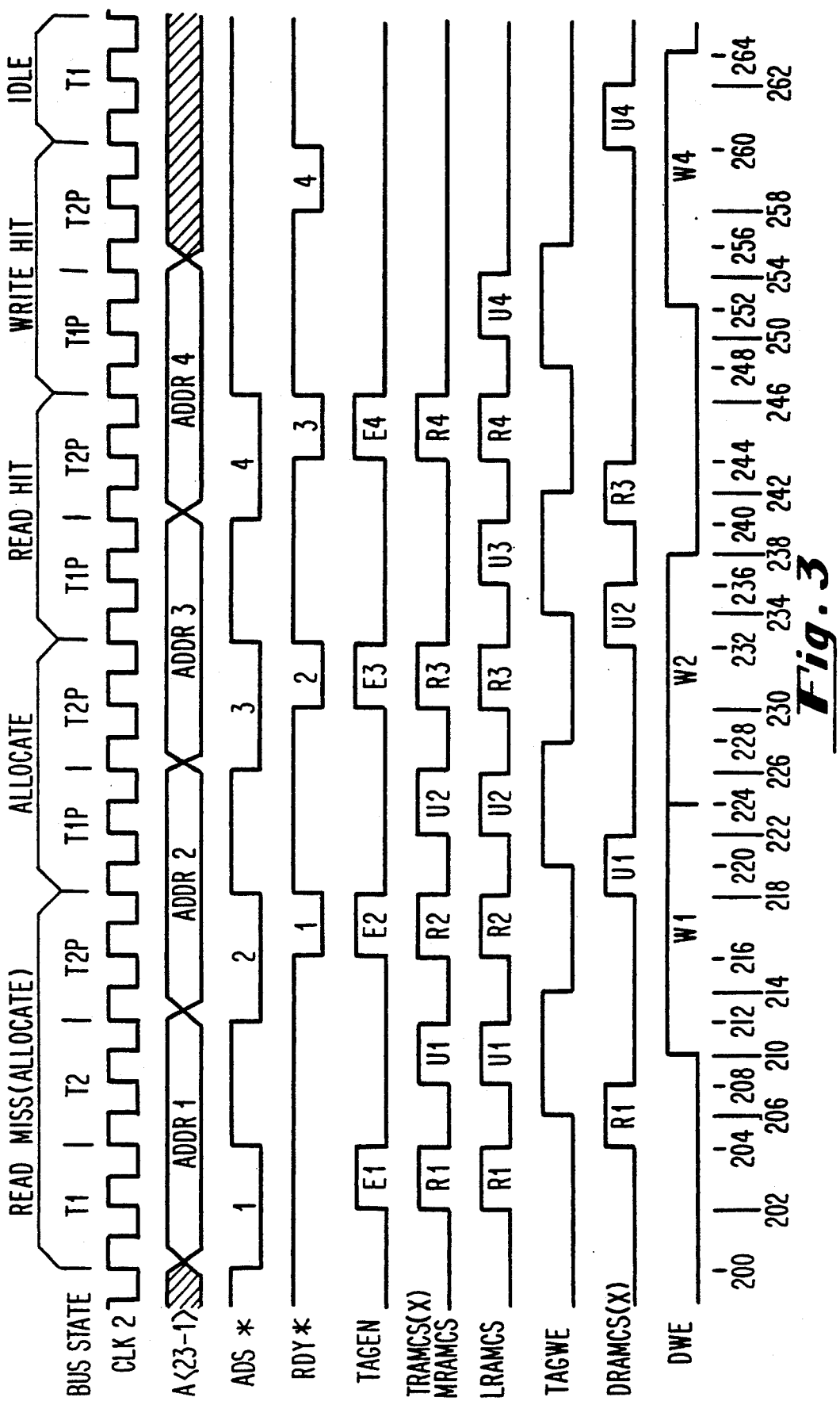
FIG. 3 is a timing diagram of various signals used in the cache system of FIG. 2 and the computer of FIG. 1.

The timing of the various signals in this system are shown in more detail in FIG. 3. Four exemplary cycles are shown, two read miss or allocate cycles, a read hit cycle and a write hit cycle. The timing of a snoop cycle is similar to that of an allocate cycle, except that data is not written to the DATA RAM 100 and the proper line bit is invalidated in the TAG RAM 110. In the illustrated sequence the processor 20 has been in an idle state and is commencing with a read operation. The operation commences at time 200 where the processor enters a T1 state. At time 200 the ADS* signal goes low to indicate that an address is being presented onto the bus. The address and control is presented shortly after time 200. The CLK2 signal is the basic timing signal used by the processor 20 and is present in the processor control bus PC. At time 202, the next rising edge of the CLK2 signal, the address is considered sufficiently stable on the bus and tag comparison operation is commenced. To this end the TAGEN or tag enable signal, the appropriate TRAMCS signal, the MRAMCS signal and the LRAMCS signal are driven high so that the tag and line values, the tag valid information and the LRU information can be obtained from the various RAM's. At time 204, the next rising edge of the CLK2 signal, the TAGEN signal and the TRAM, MRAM and LRAM chip select signals go low and the ADS* signal goes high. The DATA RAM 100 chip select is activated in this case of a nonpipelined operation to allow zero wait state operation.

Because the comparator 112 has determined that this is a processor read cache miss or allocate operation, new tag value and line valid information must be presented to the TAG RAM 110, new tag valid information must be provided to the TAG VALID RAM 114 and the LRU values shuffled. Therefore at time 206, the next falling edge of the CLK2 signal, the TAGWE signal goes high to prepare the various RAM's 110, 114 and 116 for a write operation. At time 208, the next rising edge of the CLK2 signal, the appropriate TRAMCS signal goes high, the MRAMCS signal goes high and the LRAMCS signal goes high. This causes the data which is being presented to the various RAM's to be stored to update the tag value, line valid bit, tag valid bit and LRU data to reflect the new information which is being stored. At time 210, the next falling edge of the CLK2 signal, the DWE or data write enable signal goes high in preparation for writing data into the DATA RAM 100 because this is a read miss and therefore the data should be cached. At time 212, the next rising edge of the CLK2 signal, the ADS* signal goes low to indicate that the next address is being presented onto the bus. Also at this time the TAG RAM 110, TAG VALID RAM 114 and LRU RAM 116 chip select signals go low so that the tag update is completed. At time 214, the next falling edge of the CLK2 signal, the TAGWE signal is lowered to complete the cache tag and LRU information write cycle. At time 216, the next rising edge of the CLK2 signal, the RDY* signal, which indicates that the first cycle, cycle 1, has completed, is presented to indicate this completion to the processor 20. Also at this time the address 2 or second address has been fully presented and it is appropriate to determine if there is a miss or hit operation in progress. Therefore the TAGEN, TRAM, MRAM and LRAM chip select signals go high.

At time 218, the next rising edge of the CLK2 signal, the ADS* and RDY* signals go high. Also at this time the tag related signals go low, the various comparison operations having been completed. Finally at this time, the DRAMCS signal that is appropriate for the particular way goes high so that the writing of the data into the DATA RAM 100 is performed. At time 220, the next falling edge of the CLK2 signal, the TAGWE signal goes high because it has been determined that this is an allocate operation in the illustrated embodiment and therefore data must be written to the various RAM's to update the tag and LRU information. At time 222, the next rising edge of the CLK2 signal, the appropriate TRAMCS signal, the MRAMCS signal and the LRAMCS signals go high so that the new updated information is written into the various RAM's, 110, 114 and 116. Also at this time the DRAMCS signal goes low completing the write operation to the DATA RAM 100 for cycle 1.

At time 224, the next falling edge of the CLK2 signal, the DWE signal would go low if appropriate, but in the illustrated case a second allocate operation is in progress and therefore the DWE signal stays at a high state. At time 226, the next rising edge of the CLK2 signal, the ADS* signal goes low to indicate that the address is being presented onto the bus for cycle 3. At this time the update of the tag and LRU information is completed and therefore the TRAMCS, MRAMCS and LRAMCS signals go low. At time 228, the next falling edge of the CLK2 signal, the TAGWE signal goes low completing the tag information update sequence. At time 230, the next rising edge of the CLK2 signal, the RDY* signal goes low indicating the completion of the second cycle. Additionally at this time because the addresses are present and stable on the address bus, a tag check operation for the third cycle must be initiated. Therefore the TAGEN, TRAMCS, MRAMCS and LRAMCS signals go high to allow the various information to be read. In the particular case of cycle 3 this is a read hit operation, so that the tag data will not be updated, but only the LRU information needs to be updated. At time 232, the next rising edge of the CLK2 signal, the ADS* and RDY* signals go high, indicating completion of the second cycle data phase. Additionally at this time the TAGEN, TRAMCS, MRAMCS and LRAMCS signals go low indicating that the tag checking operation has been completed. Finally at time 232 the DRAMCS signal goes high for cycle 2 so that the data present at the DATA RAM 100 is stored.

At time 234, the next falling edge of the CLK2 signal, the TAGWE signal goes high because this has been a read hit and it is necessary to update LRU RAM 116. At time 236, the next rising edge of the CLK2 signal, the LRAMCS signal is raised to enable the write operation to occur to the LRU RAM 116. Also at this time the proper DRAMCS signal or signals are lowered so that the write operation of the data of cycle 2 is completed to the DATA RAM 100. At time 238, the next falling edge of the CLK2 signal, the DWE signal is lowered because it is no longer necessary to write data to the DATA RAM 100. At time 240, the next rising edge of the CLK2 signal, the ADS* signal goes low indicating that the addresses for the 4th cycle are being presented onto the address bus. Additionally at this time the LRAMCS signal goes low to terminate the actual write operation to the LRU RAM 116. Finally at this time the DRAMCS signal goes high while the DWE signal is low, indicating that this is a read operation of the DATA RAM 100 and thus the data is being provided from the cache system 24 and not the main memory 20 for cycle 3. At time 242, the next falling edge of the CLK2 signal, the TAGWE signal goes low to complete the cycle for writing to the LRU RAM 116. At time 244, the next rising edge of the CLK2 signal, the RDY* signal goes low to indicate the completion of cycle 3. Additionally at this time because the addresses are present on the address bus for cycle 4, the TAGEN, TRAMCS, MRAMCS and LRAMCS signals go high to obtain the tag information. Finally at this time the DRAMCS signal goes low to complete the read operation from the DATA RAM 100.

At time 246, the next rising edge of the CLK2 signal, the ADS* and RDY* signals go high indicating that the data phase of the third cycle is completing. Additionally at this time the various tag related signals go low to indicate that the tag read and comparison operation has been completed. At time 248, the next falling edge of the CLK2 signal, the TAGWE signal goes high because this has been determined to be a write hit and therefore, while the TAG RAM 110 need not be updated, the LRU RAM 116 must be updated and therefore the TAGWE signal must be raised. At time 250, the next rising edge of the CLK2 signal, the LRAMCS signal is raised to write the new LRU information into the LRU RAM 116. At time 252, the next falling edge of the CLK2 signal, the DWE signal is raised because this is a write hit operation and therefore data must be provided to the DATA RAM 100. At time 254, the next rising edge of the CLK2 signal, the LRAMCS signal is lowered to complete the writing of the LRU information to the LRU RAM 116. At time 256, the next falling edge of the CLK2 signal, the TAGWE signal is lowered. At time 258, the next rising edge of the CLK2 signal, the RDY* signal is lowered to indicate the completion of the data phase of cycle 4. It is noted that a new ADS* signal has not been provided because the processor 20 is entering an idle state and therefore no address need be presented. At time 260, the next rising edge of the CLK2 signal, the RDY* signal is raised and the DRAMCS signal is raised. Thus the data is written into the DATA RAM 100, the operation being completed at time 262, the next rising edge of the CLK2 signal, when the DRAMCS signal is lowered. To complete the cycle the DWE signal is lowered at time 264, the next falling edge of the CLK2 signal.

Therefore it can be seen that for each memory operation the TAG RAM 110, the TAG VALID RAM 114 and the LRU RAM 116 are read, while the TAG RAM 110 and the TAG VALID RAM 114 are written only if information needs to be updated, such as new addresses during allocation cycles or invalid bits during snooping cycles, and the LRU RAM 116 is written each time a hit or allocate cycle occurs to keep the LRU information current.

Figure 4:
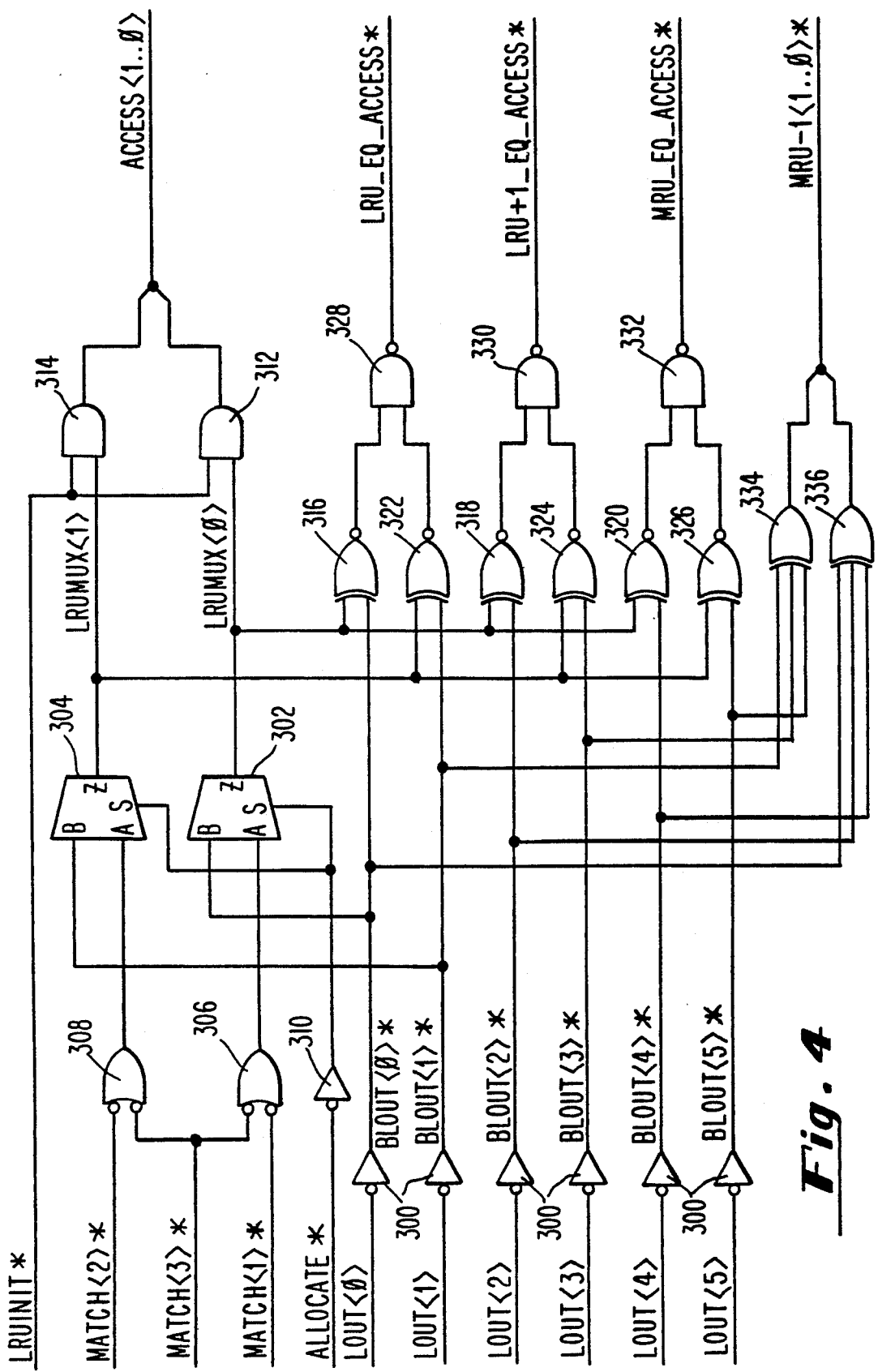
FIGS. 4–10 are schematic diagrams of portions of the circuitry of the cache system of FIG. 2.

Proceeding now to some of the more detailed schematics of the LRU logic 118 and the timing and control logic 102, the 6 bits of information provided by the LRU RAM 116 are received at the inputs of 6 inverters 300. As found in FIG. 4, it is noted that bits 0 and 1 of the LRU RAM 116 contain information related to which was the least recently used way of the four ways in the set, while bits 2 and 3 indicate the LRU+1 way or next to least recently used and bits 4 and 5 indicate the most recently used (MRU) way. It is noted that 2 bits are associated with each way because with four ways in the cache, two bits are necessary to indicate each way. Only three sets need be saved because the fourth way, the MRU-1 way, can be developed from the other three as will be shown. The outputs of the inverters 300 are, respectively, the BLOUT<5-0>* signals.

The BLOUT<0>* signal is provided as one input to a two to one multiplexer 302. The BLOUT<1>* signal is provided to a similar input of a second two to one multiplexer 304. The other input to the multiplexer 302 is provided by the output of a two input NAND gate 306. One input to the NAND gate 306 is the MATCH-<1>* signal which, when low, indicates that a match has been made on way 1. A second input to the NAND gate 306 is the MATCH<3>* signal, which, when low, indicates that a match has been made with way 3. The second input to the multiplexer 304 is provided by the output of a two input NAND gate 308, one of whose input signals is the MATCH<3>* signal. The other input to the NAND gate 308 is the MATCH-<2>* signal, which when low, indicates that a match has been made to way 2 of the cache. A match for purposes of this specification is when the tag address values match the presented address, the various valid bits being ignored in developing the MATCH* signals. The select inputs to the multiplexer 302 and 304 are provided by the output of an inverter 310 whose input is the ALLOCATE* signal. The ALLOCATE* signal is low when a cacheable allocate or processor read miss operation is occurring. The output of the multiplexer 302 is the LRUMUX<0> signal, while the output of the multiplexer 304 is the LRUMUX<1> signal. The LRUMUX signals indicate the way that will be selected from the DATA RAM 100 either based on a match which is developed as a result of a hit, either a processor based read or write hit or a snoop hit, or the least recently used way in the case of an allocate cycle.

The LRUMUX<0> signal is provided as one input to a 2 input AND gate 312. The other input to the AND gate 312 is provided by LRUINIT* signal which, when low, is an indication that the LRU RAM 116 is being initialized. Similarly, the LRUMUX<1> signal is provided as one input to a 2 input AND gate 314, the other input being the LRUINT* signal. The outputs of the AND gates 312 and 314 are the ACCESS<1-0> signals, which represent the way being accessed from in hit operation or to be accessed in read miss operations in the particular memory operation.

The LRUMUX<0> and LRUMUX<1> signals are also used as inputs to a series of EQUAL gates to determine if the LRU, LRU+1 or MRU way is currently being accessed. The LRUMUX<0> signal is provided as one input to EQUAL gates 316, 318 and 320, while the LRUMUX<1> signal is provided as one input to a series of 2 input EQUAL gates 322, 324 and 326. The second input to the EQUAL gate 316 is the BLOUT<0>* signal, while the second input to the EQUAL gate 322 is the BLOUT<1>* signal. The outputs of the EQUAL gates 316 and 322 are the two inputs to a 2 input NAND gate 328, whose output is the LRU—EQ—ACCESS* signal. Therefore if the way currently being or to be accessed is the LRU way, the LRU—EQ—ACCESS* signal goes low.

The second input to the EQUAL gate 318 is the BLOUT<2>* signal, while the second input to the EQUAL gate 324 is the BLOUT<3>* signal. The outputs of the EQUAL gates 318 and 324 are provided to the two inputs of a 2 input NAND gate 330, whose output is the LRU+1—EQ—ACCESS* signal. Similarly, the BLOUT<4>* signal is provided as the second input to the EQUAL gate 320 while the BLOUT<5>* signal is provided as the second input to the EQUAL gate 326. The outputs of the EQUAL gates 320 and 326 are the inputs to a 2 input NAND gate 332, whose output is referred to as the MRU—EQ—ACCESS* signal. Therefore the EQUAL gate sets are used to determine if one of the stored ways is being accessed.

It is further necessary to determine the MRU-1 way and this is performed by two 3 input XOR gates 334 and 336. The three input XOR gate 334 receives the BLOUT<1>*, BLOUT<3>* and BLOUT<5>* signals, while the 3 input XOR gate 336 receives the BLOUT<0>*, BLOUT<2>* and BLOUT<4>* signals. The output of the XOR gate 334 is the MRU-1<1>* signal, while the output of the XOR gate 336 is the MRU-1<0>* signal. Thus it can be seen it is necessary to store only 3 of the 4 ways and that the fourth way can be developed readily. Because each hit or allocate cycle causes data to be read or written, it is necessary to update or shuffle the LRU values on each of those operations. The following equations are used to determine the way shuffling occurs in the LRU RAM 116. If a processor cycle is occurring, the equations are as follows:

MRU = ACCESS

LRU+1 = MRU−1 if (ACCESS = LRU) +
   (ACCESS = LRU+1) + LRU+1 if (ACCESS = MRU) +
                        (ACCESS = MRU−1)

LRU = LRU+1 if (ACCESS = LRU) +
                LRU if (ACCESS < > LRU)

where ACCESS is the value of the way currently being or to be accessed.

Thus, the way being or to be accessed is set as the MRU way, while the LRU way remains the previous LRU way if the LRU way is not being or to be accessed or is assigned the previous LRU+1 way if the LRU way is being or to be accessed. The LRU+1 way stays the previous LRU+1 way if the MRU or MRU-1 ways are being or to be accessed or is set to the previous MRU-1 way if the LRU or LRU+1 ways are being or to be accessed.

If a snoop cycle is occurring the following equations are used:

MRU = MRU if (ACCESS < > MRU) +
                MRU−1 if (ACCESS = MRU)

LRU+1 = LRU+1 if (ACCESS = LRU) +
                LRU if (ACCESS < > LRU)

LRU = ACCESS

Thus the way being or to be accessed is set to be the LRU way. This differs from the processor-based case because this location is now invalid because of the snoop hit and thus the chance of valid data not being replaced is increased. The MRU way stays the previous MRU way if the access is not to the MRU way or is set to the previous MRU-1 way if the access is to be MRU way. The LRU+1 way stays the previous LRU+1 way if the access is to the previous LRU way or is set to the previous LRU way if the access is not to the previous LRU way.

Thus the shuffling or reshuffling is properly based on time since processor access, the use age of the way.

Figure 5:
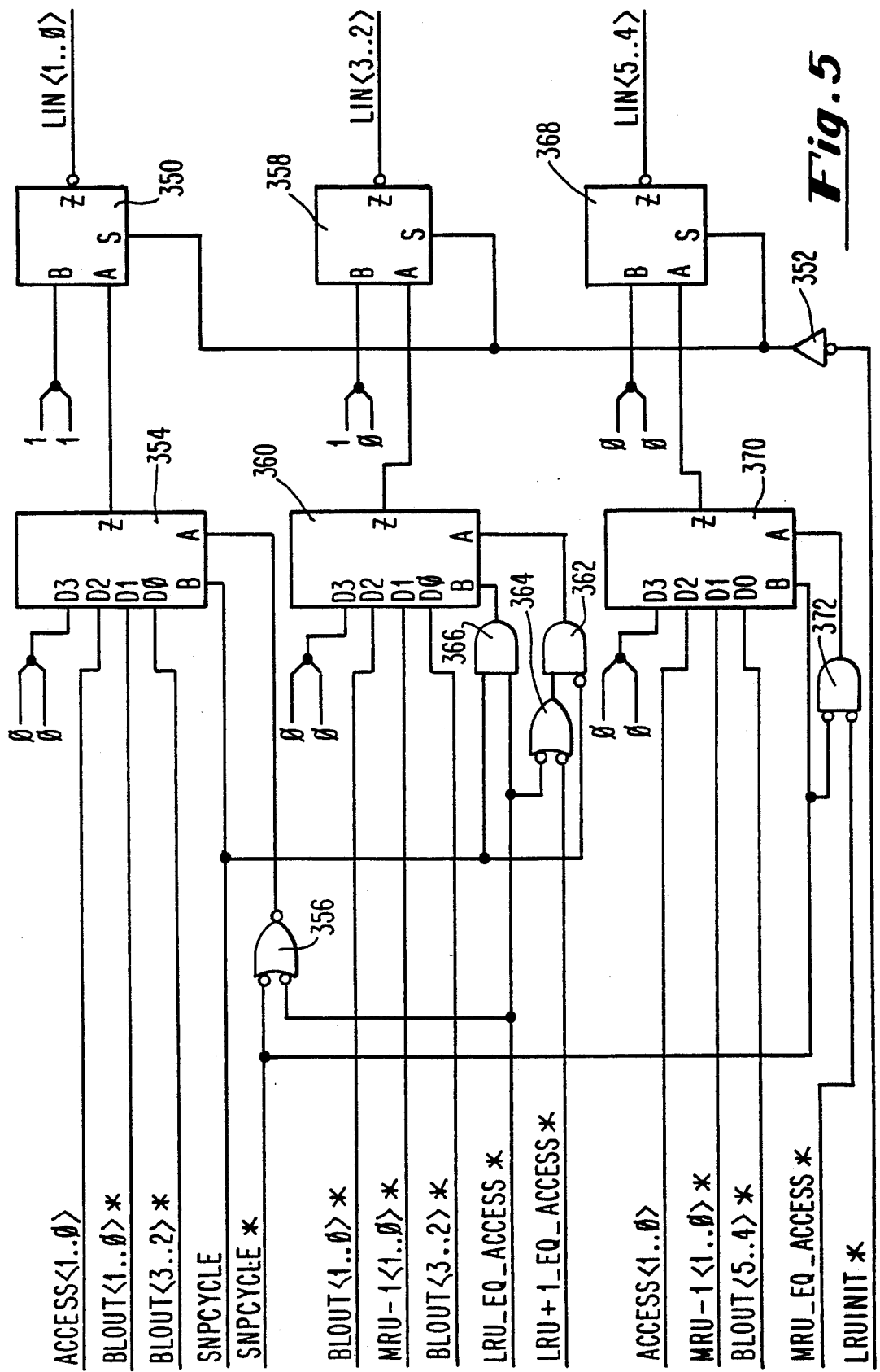

This shuffling is developed using a series of multiplexers as shown in FIG. 5. The LIN<1-0> signals, which are two of the inputs to the LRU RAM 116, are provided by the inverted outputs of a 2 bit wide 2 to 1 multiplexer 350. The selection input to the multiplexer 350 is provided by the output of an inverter 352 which receives at its input the LRUINIT* signal. The B inputs to the multiplexer 350 receive two high values so that if the LRU RAM 116 is to be initialized, as indicated by the LRUINIT* signal being low, the LIN<1-0> signals are both low, indicating that way 0 was least recently used. The second set of inputs to the multiplexer 350 is provided by the outputs of a two bit wide 4 to 1 multiplexer 354. The B selection input to the multiplexer 354 is provided by the SNPCYCLE signal, while the A or lower order bit of the multiplexer selection is provided by the output of a two input AND gate 356. One input to the AND gate 356 is the SNPCYCLE* or inverted SNPCYCLE signal, while the other input is the LRU—EQ—ACCESS* signal. The BLOUT<3-2>* signals are provided to the 00 inputs of the multiplexer 354, while the BLOUT<1-0>* signals are provided to the 01 inputs of the multiplexer 354. The ACCESS<1-0> signals are provided to the 10 inputs, while low values are provided to the 11 inputs. Therefore, if a snoop cycle is occurring, the 10 input is selected at the multiplexer 354. Thus the accessed way in a snoop cycle is always indicated as the least recently used way. If a snoop cycle is not occurring, then the selection is between inputs 00 and 01, depending upon whether the way being accessed was the previously least recently used. If so, then the BLOUT<3-2>* signals or LRU+1 value is provided to the LRU. If not, then the one input is selected and the current LRU value is passed through and remains the LRU value.

A 2 bit wide 2 to 1 multiplexer 358 is utilized to provide the LIN<3-2> or LRU+1 information to the LRU RAM 116. The LIN<3-2> signal is provided by the inverted outputs of the multiplexer 358, whose select input is provided by the output of the inverter 352. The B or second channel inputs to the multiplexer 358 are provided by high and low signals, respectively, so that upon initiation of the LRU, the LRU+1 indication is way 1. The second inputs of the multiplexer 358 are provided by the output of a 2 bit wide 4 to 1 multiplexer 360. The 00 inputs to the multiplexer 360 are provided by the BLOUT<3-2>* signals, while the 01 inputs are provided by the MRU-1<1-0>* signals. The 10 inputs to the multiplexer 360 are provided by the BLOUT<1-0>* signals, while the 11 inputs are connected to low level signals. The least significant bit of the selection inputs in the multiplexer 360 is provided by the output of a two input AND gate 362. An inverted input to the AND gate 362 is connected to the SNPCYCLE signal, while the other input to the AND gate 362 is provided by the output of a two input NAND gate 364. One input to the NAND gate 364 is the LRU—EQ—ACCESS* signal, while the other input is the LRU+1—EQ—ACCESS* signal. The high order bit of the selection inputs of the multiplexer 360 is provided by the output of a two input AND gate 366. One input to the AND gate 366 is the SNPCYCLE, signal while the other input is the LRU—EQ—ACCESS* signal. This connection of the multiplexers 360 and 358 with the associated logic circuitry 362, 364 and 366 provides the LRU+1 equations as indicated above for the snoop and processor cycles.

The MRU or LIN<5-4> bits are provided at the inverted outputs of a two bit wide 2 to 1 multiplexer 368. The selection input to the multiplexer 368 is provided by the output of the inverter 352, while the B or second channel inputs are connected to two low inputs so that upon initiation of the LRU RAM 116 the most recently used way is considered to be way 3. The second set of inputs to the multiplexer 368 is provided by the outputs of a two bit 4 to 1 multiplexer 370. The 00 inputs to the multiplexer 370 are provided by the BLOUT<5-4>* signals, while the 01 inputs receive the MRU-1<1-0>* signals. The 10 inputs receive the ACCESS<1-0> signals, while the 11 inputs have both bits connected to a low level signal. The least significant selection bit of the multiplexer 370 is provided by the output of a two input NOR gate 372. One input to the NOR gate 372 is provided by the MRU—EQ—ACCESS* signal, while the other input receives the SNPCYCLE* signal. The high order selection bit of the multiplexer 370 is connected to the SNPCYCLE* signal. Therefore it can be seen that this combination of the multiplexers 368 and 370 and gate 372 provides the functionality of the equations for the MRU as indicated above.

It is noted that this LRU reshuffling logic is active at all times for each access and therefore chip selection and write control logic is necessary to properly save the LRU reshuffling information only on processor read or write hit operations, snoop hit operations and allocation or processor read miss operations. This logic is detailed in the following figures.

Figure 6:
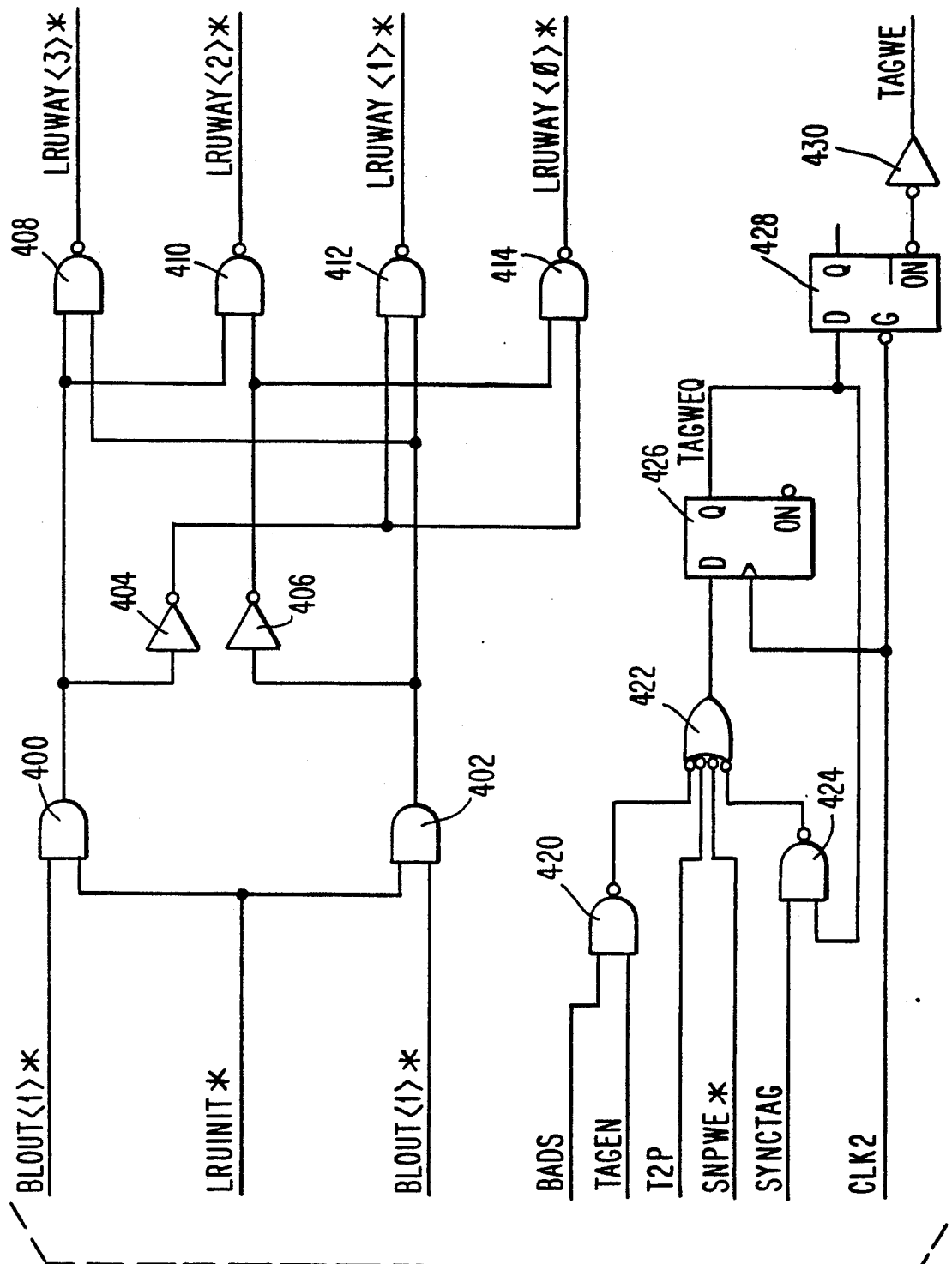

One of the functions of the LRU logic 118 is to provide to the timing and control logic 102 an indication into which way data is to placed in an allocate situation. This logic is shown in FIG. 6. A two input AND gate 400 receives as its inputs the BLOUT<1>* and LRUINIT* signals. A second two input AND gate 402 receives as its inputs the BLOUT<0>* and LRUINIT* signals. An inverter 404 is connected to the output of the AND gate 400, while an inverter 406 is connected to the output of the AND gate 402. The desired LRU way indications are provided by the outputs of 4 two input NAND gates 408, 410, 412 and 414. The two inputs to the NAND gate 408 are the output of the AND gate 400 and the output of the AND gate 402, with the output of the NAND gate 408 being the LRUWAY<3>* signal, which indicates that way 3 is to be utilized. The inputs to the NAND gate 410 are provided by the output of the AND gate 400 and the output of the inverter 406 so that the output of the NAND gate 410 is the LRUWAY<2>* signal, to indicate that way 2 is to be selected. The inputs to the NAND gate 412 are the output of the AND gate 402 and the output of the inverter 404, so that the output of the NAND gate 412 represents the LRUWAY<1>* signal to indicate that way 1 is to be used. The LRUWAY<0>* signal is produced as the output of the NAND gate 414, which receives as inputs the outputs of the inverters 404 and 406. Thus for allocate operations the least recently used way is directly indicated and decoded for use by the timing and control logic 102.

The TAGWE signal is produced as shown in FIG. 6. The BADS signal, a buffered and inverted version of the ADS* signal provided on the processor control bus PC, is provided as one input to a two input NAND gate 420. The TAGEN signal, indicating that a tag access lookup cycle is in progress, is provided as a second input to the NAND gate 420. The output of the NAND gate 420 is one input to a four input NAND gate 422. A second input to the NAND gate 422 is the T2P* signal, which indicates that the processor 20 or processor bus is not in state T2P. This state condition can be shown on the timing diagram of FIG. 3, where the processor bus states are shown. A third input to the NAND gate 422 is the SNPWE* signal, which indicates that a write operation is in progress and a bus master is in control. The final input to the NAND gate 422 is provided by the output of a two input NAND gate 424. One input to the NAND gate 424 is the SYNCTAG signal, which when active high indicates that the bus cycle is in a state where a tag and LRU value update or write should occur, if necessary. The second input to the NAND gate 424 is the noninverted output of a D-type flip-flop 426. The D input to the flip-flop 426 is provided by the output of the NAND gate 422, while the clocking signal to the flip-flop 426 is provided by the CLK2 signal. The noninverted output to the flip-flop 426 is also provided to the D input of a latch 428. The inverted enable input of the latch 428 is connected to the CLK2 signal, with the inverted output is connected to an inverter 430. The output of the inverter 430 is the TAGWE signal. Thus the TAGWE signal is produced as shown in FIG. 3.

Figure 8:
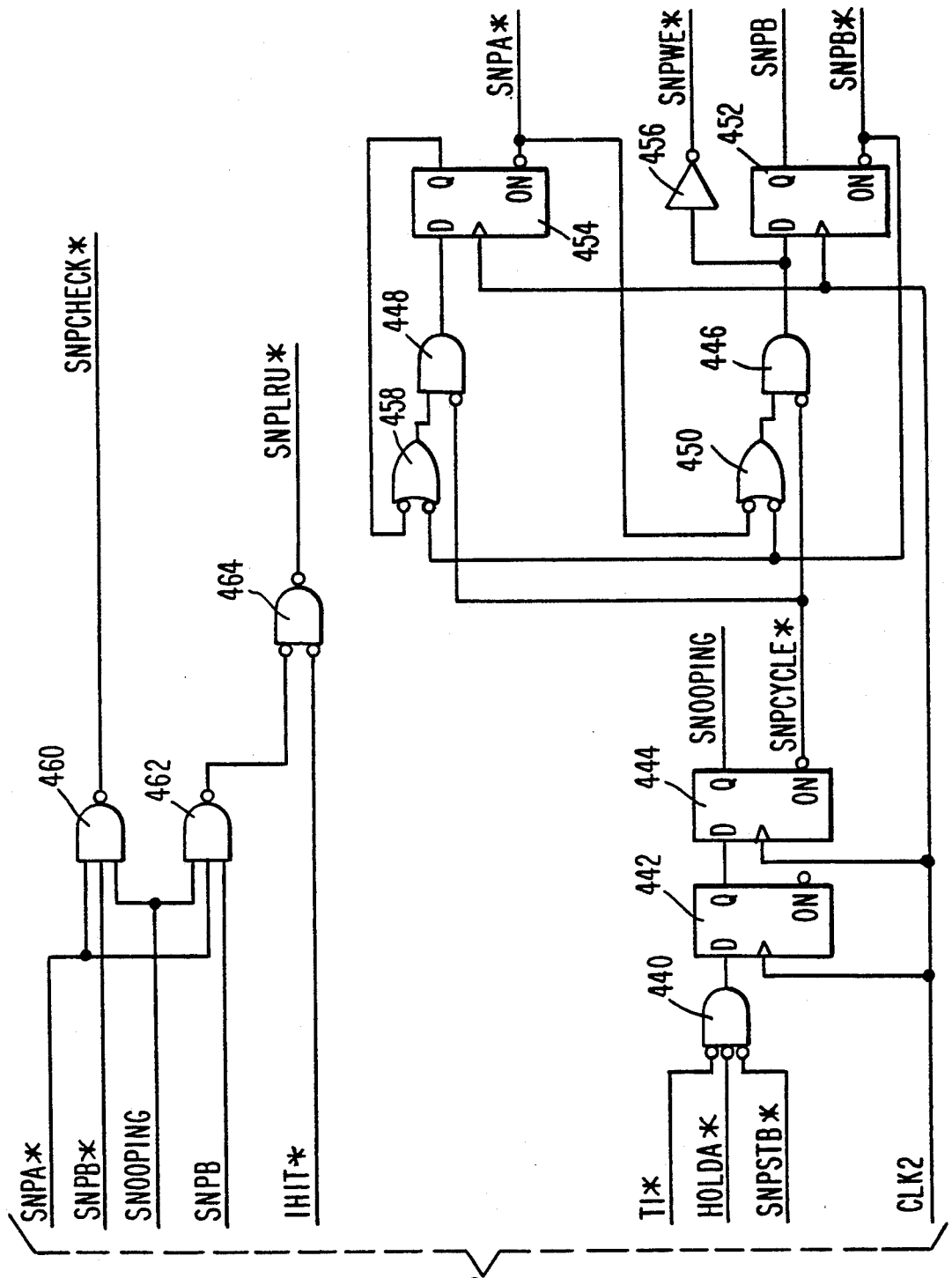

A state machine is provided to determine where operation is in in a snoop cycle. This state machine is shown in FIG. 8. The T1* signal, which indicates when low that the processor 20 bus is in state T1; the HOLDA* signal, which indicates when low that the processor 20 is in hold; and the SNPSTB* signal or snoop strobe signal, which is true low when a snoop write operation is occurring, are presented as the inputs to a three input NOR gate 440. The output of the NOR gate 440 is provided to the D input of a D-type flip-flop 442. The clocking input to the flip-flop 442 is provided by the CLK2 signal. The non-inverted output of the flip-flop 442 is provided to the D input of a D-type flip-flop 444, whose clocking input is also provided by the CLK2 signal. The noninverted output of the flip-flop 444 is the SNOOPING signal, while the inverted output is the SNPCYCLE* signal, which indicates that a snoop cycle is in progress when low. The SNPCYCLE* signal is provided to inverting inputs of two AND gates 446 and 448. The second input to the AND gate 446 is provided by the output of a two input NAND gate 450. One of the inputs to the NAND gate 450 is provided by the inverted output of a D-type flip-flop 452, while the other input to the NAND gate 450 is provided by the inverted output of a D-type flip-flop 454. Both of the flip-flops 452 and 454 are clocked by the CLK2 signal. The output of the AND gate 446 is provided to the D input of the flip-flop 452 and to an inverter 456. The output of the inverter 456 is the SNPWE* signal. The noninverted output of the flip-flop 452 is the SNPB signal, while the inverted output is the SNPB* signal. The SNPB* signal is provided as one input to a two input NAND gate 458. The second input to the NAND gate 458 is provided by the noninverted output of the flip-flop 454. The output of the NAND gate 458 is connected to the second input of the AND gate 448. The D input of the flip-flop 454 is connected to the output of the NAND gate 448. Thus a state machine is developed to track the cycling of a snooping operation.

The SNPA* signal, the inverted output of the flip-flop 454, and the SNOOPING signal are provided as two inputs of two three input NAND gates 460 and 462. The third input to the NAND gate 460 is the SNPB* signal, while the third input to the NAND gate 462 is the SNPB signal. The output of the NAND gate 460 is the SNPCHECK* signal, which indicates the time in a snoop bus cycle to perform a tag read operation, while the output of the NAND gate 462 is provided as one input to a two input OR gate 464. The other input to the AND gate 464 is the IHIT* signal, which will be defined later, with the output of the OR gate 464 being the SNPLRU* signal, whose use will also be indicated later.

Figure 9:
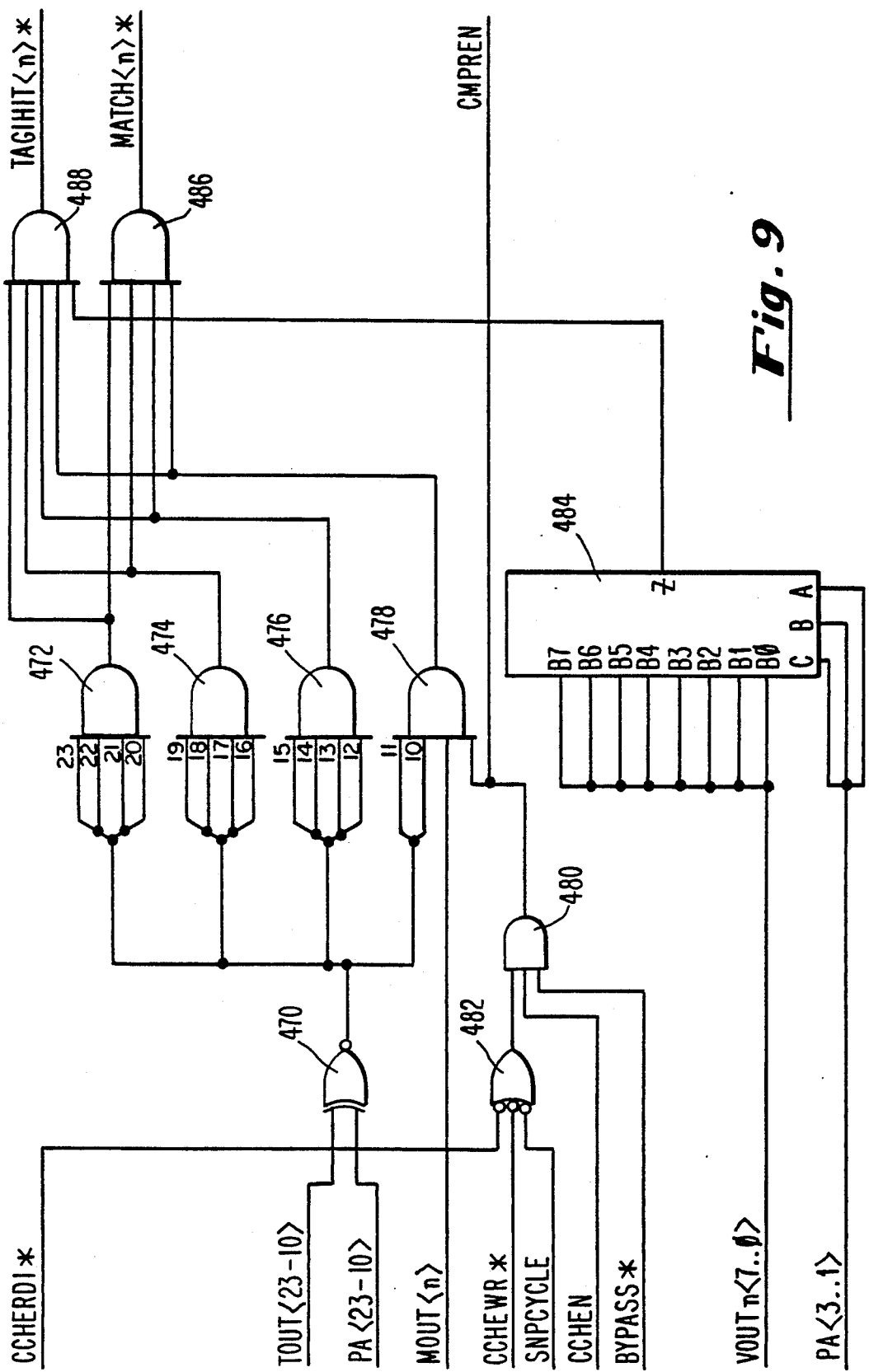

Portions of the circuitry forming the comparator 112 are shown in FIG. 9. The illustrated circuitry determines if matches and hits have been developed. Shown in FIG. 9 is the circuitry for one way of the comparator 112, but it is noted that four similar groups of circuits are provided in the comparator 112 to perform the comparison operations for each of the four ways. The difference between the groups is indicated by the small n symbol in the figure. The stored tag address output values or TOUTn<23-10> from the TAG RAM 110 are provided to a series of 14 EQUAL gates 470. The second inputs to the EQUAL gates 470 are the processor address bus PA bits 23-10, so that this series of EQUAL gates 470 performs the lookups and matching to determine if the tag address values are equal to the presented address values. The 14 outputs of the EQUAL gates 470 are provided to a series of AND gates 472, 474, 476 and 478. The AND gates are all four input AND gates with all of the inputs to AND gates 472, 474 and 476 coming from the EQUAL gates 470. Two of the inputs to the AND gate 478 come from the EQUAL gates 470, with a third input being the MOUT<n> signal provided from the TAG VALID RAM 114 for the particular way to indicate whether the tag is valid. The fourth input to the AND gate 478 is provided by the output of a three input AND gate 480. One input to the AND gate 480 is provided by the output of a three input NAND gate 482. The inputs to the NAND gate 482 are the CCHERD1* signal, which indicates that a read operation is in progress; the CCHEWR* signal, which indicates that a write operation is in progress; and the SNPCYCLE signal. The second input to the AND gate 480 is the CCHEN signal which indicates that the cache system 24 is enabled. This is provided as the output of an addressable register (not shown) in the cache system 24. The final input to the AND gate 480 is the BYPASS* signal which indicates that the cache system 24 is not ready or able to process the current cycle and so a read miss must be forced. This signal is generally only valid during flush operations so that any possible coherency problems are not of concern. Thus the AND gates 472, 474, 476 and 478 are used to complete the determination if the addresses are equal and if the TAG is valid.

In addition to having tag values checked, it is also required that the line value is valid. To this end, the line valid outputs are provided from the TAG RAM 110 to an 8 to 1 multiplexer 484. The processor address bits 3-1 are provided to the multiplexer selection inputs so that the line valid bit of appropriate 16 bit line is provided at the output of the multiplexer 484.

Various hit indications are provided by the comparator 112. A MATCH<n>* signal is provided as the output of a four input NAND gate 486. The four inputs to the NAND gate 486 are the outputs of the AND gates 472-478. Thus the MATCH<n>* signal is an indication that a valid tag match address value has occurred, but does not indicate that the line is necessarily valid. The TAGIHIT<n>* signal does incorporate the line valid information and is provided as the output of a five input NAND gate 488. The output of the multiplexer 484 and the outputs of the four AND gates 472-478 are the inputs to the NAND gate 488.

Figure 10:
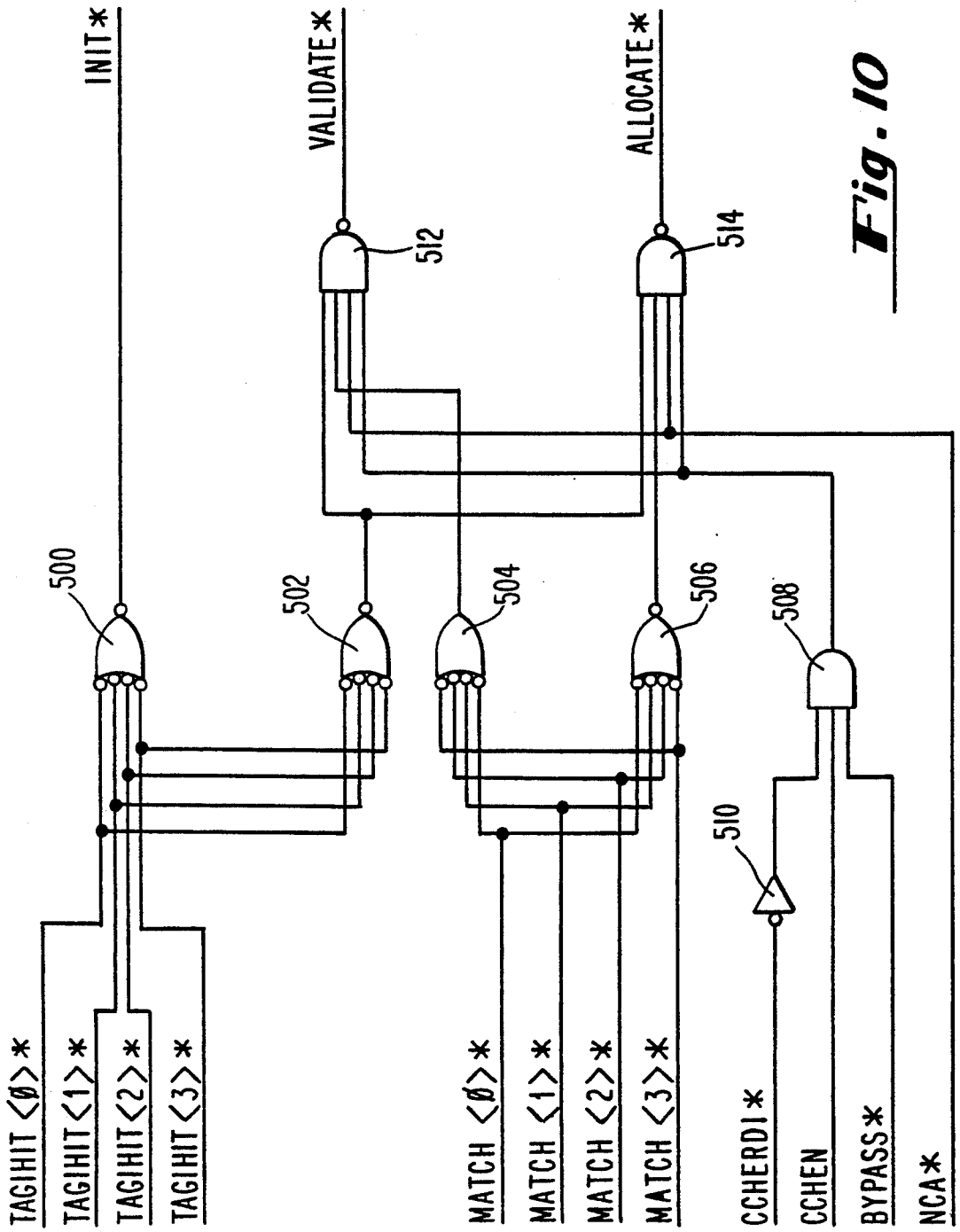

The TAGIHIT<n>* signals for the four ways are provided as four inputs to a four input AND gate 500 (FIG. 10). The output of the AND gate 500 is the IHIT* signal, which when low, indicates that a hit has been determined in one of the ways. The four TAGIHIT<n>* signals are also provided to the input to a second four input AND gate 502. The MATCH<n>* signals for the four ways are provided as the four inputs to a four input NOR gate 504. The four MATCH signals are also provided as inputs to a four input AND gate 506. A three input AND gate 508 receives as its inputs the CCHEN signal, the BYPASS* signal and the output of an inverter 510, which receives as its input the CCHERD1* signal. The output of the AND gate 502, the output of the NOR gate 504, the output of the AND gate 508 and a signal referred to as NCA*, which indicates that the particular address being addressed on the processor bus is not a cacheable address when asserted low, are provided as the four inputs to a four input NAND gate 512. The output of the NAND gate 512 is the VALIDATE* signal which, when low, indicates that a cache read miss operation has occurred because of a line invalidation. The output of the AND gate 502, the output of the AND gate 506, the output of the AND gate 508 and the NCA* signal are the four inputs to a four input NAND gate 514, the output of which is the ALLOCATE* signal. The ALLOCATE* signal, when low, indicates that any type of cache miss has occurred during a processor read operation and therefore a new data must be provided or allocated to cache.

Figure 7:
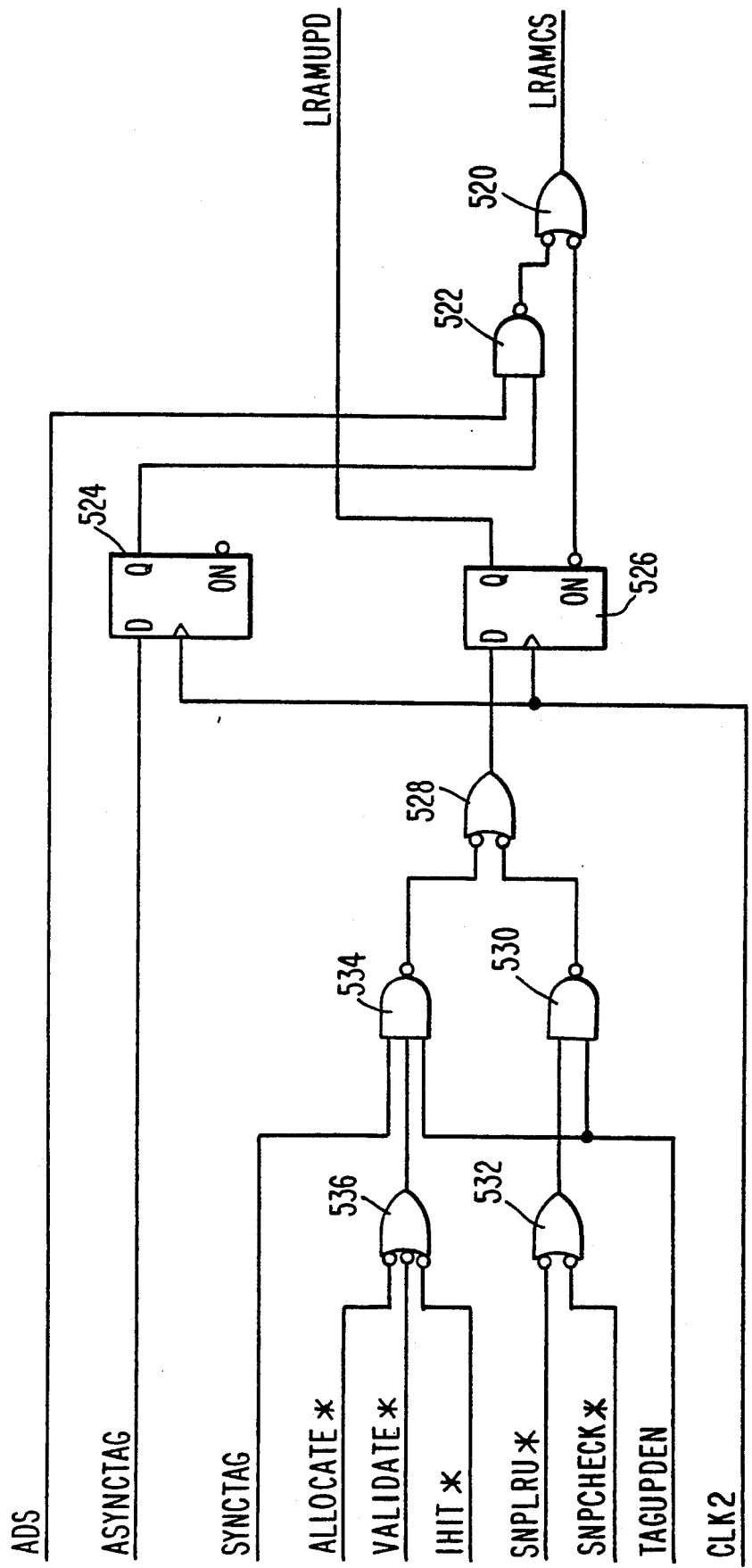

The LRAMCS signal also needs to be developed to determine when the LRU RAM 116 is activated. The LRAMCS signal is provided as the output of a two input NAND gate 520 (FIG. 7). One input to the NAND gate 520 is provided by the output of a two input NAND gate 522. One input to the NAND gate 522 is the ADS signal which is high when addresses are being presented by the processor bus. The second input to the NAND gate 522 is the noninverted output of a D-type flip-flop 524. The D input to the flip-flop 524 is provided by the ASYNCTAG signal, which indicates a T1 or T2P processor-controlled bus state is occurring, and, when qualified with ADS, is an indication that a tag read operation for a processor cycle should occur. The clocking input of the flip-flop 524 is provided by the CLK2 signal.

The second input to the NAND gate 520 is provided by the inverted output of a D-type flip-flop 526. The clocking signal for the flip-flop 526 is provided by the CLK2 signal. The D input of the flip-flop 526 is connected to the output of a two input NAND gate 528. One input of the NAND gate 528 is connected to the output of a two input NAND gate 530. The TAGUPDEN signal to indicate that a tag value is to be updated, developed from the combination BYPASS* and CCHEN signals to indicate that the tag system is active and updates should be performed, is one input to the NAND gate 530. The second input to the NAND gate 530 is provided by the output of a two input NAND gate 532. One input to the NAND gate 532 is the SNPLRU* signal, while the other input is the SNPCHECK* signal. The second input to the NAND gate 528 is provided by the output of a three input NAND gate 534. One input to the NAND gate 534 is the TAGUPDEN signal, while a second input is the SYNCTAG signal. The third input is provided by the output of a three input NAND gate 536. The three input signals to the NAND gate 536 are the ALLOCATE*, VALIDATE* and IHIT* signals. The noninverted output of the flip-flop 526 is the LRAMUPD signal. Thus if a snoop cycle is in progress and it is time to check the tag values based on a hit or a processor hit or cache read miss cycle is occurring, TAG RAM 116 is enabled.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A cache system for use in a computer system having a processor for providing memory access operations and having another means besides the processor for providing memory access operations, the cache system organized as an n way set associative cache, where n is greater than 2, the cache system monitoring memory access operations, the cache system comprising:
   memory means for storing information on way use history for only n-1 use ages for each set in the cache system as bits simultaneously accessed when a memory address is provided;
   means for determining the way use history of each set for the nth use age from said stored way use history information for each set;
   means for determining if processor provided or the another means provided memory access cycles are being monitored;
   means for shuffling way use history information for each memory access, said means for shuffling receiving previously stored way use history information from said memory means and said means for determining the way use history for the remaining use age, by setting a way containing the accessed location on processor cache hits or a way to be accessed on processor read cache misses to the most recently used way and rearranging the other stored way use history information in order of processor use age and by setting a way containing the accessed location on snoop write cache hits to the least recently used way and rearranging the other stored way use history information in order of processor use age; and
   means for updating said stored use history information in said memory means on processor cache hit, processor read cache miss and the another means write cache hit operations to reflect the shuffled way use history information developed by said shuffling means.

2. The cache system of claim 1, wherein said memory means includes a random access memory having a width of an amount of bits necessary to identify a way times n-1.

3. The cache system of claim 1, wherein said shuffling means includes means for determining which use age way is being accessed.

4. The cache system of claim 3, wherein said shuffling means further includes n-1 multiplexers, each multiplexer providing information of a way having a defined use age to said memory means, said multiplexers input being selected based on whether the processor or the another means is providing the memory access cycle and whether the particular way having the defined use age is to be changed.

5. The cache system of claim 3, wherein said means for determining which use age way is being accessed includes means for comparing each of stored use age way information with the way being accessed information.

6. The cache system of claim 1, wherein said way use history determining means includes means for performing an exclusive or operation on the stored way use history information.

7. The cache system of claim 1, wherein said shuffling means includes means for indicating the way to be used during processor read cache miss operation for storing memory data.

* * * * *

UNITED STATES PATENT AND TRADEMARK OFFICE
CERTIFICATE OF CORRECTION

PATENT NO.   :   5,325,511

DATED        :   June 28, 1994

INVENTOR(S)  :   Michael J. Collins et al.

It is certified that error appears in the above-identified patent and that said Letters Patent is hereby corrected as shown below:

On title page, item [54] and column 1:

Please replace the current title with --LEAST RECENTLY USED REPLACEMENT APPARATUS FOR A SYSTEM WITH A SET ASSOCIATIVE CACHE--.

Signed and Sealed this

Fifth Day of December, 1995

Attest:

BRUCE LEHMAN

*Attesting Officer*  *Commissioner of Patents and Trademarks*